United States Patent
Prasad et al.

(10) Patent No.: US 11,912,146 B2
(45) Date of Patent: Feb. 27, 2024

(54) VEHICLE WITH INTEGRATED DC-DC CONVERTER

(71) Applicant: GM GLOBAL TECHNOLOGY OPERATIONS LLC, Detroit, MI (US)

(72) Inventors: Rashmi Prasad, Troy, MI (US); Chandra S. Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 57 days.

(21) Appl. No.: 17/239,241

(22) Filed: Apr. 23, 2021

(65) Prior Publication Data
US 2022/0340026 A1    Oct. 27, 2022

(51) Int. Cl.
| | | |
|---|---|---|
| B60L 53/20 | (2019.01) | |
| B60L 53/16 | (2019.01) | |
| B60L 53/18 | (2019.01) | |
| H02J 7/00 | (2006.01) | |
| H02P 27/06 | (2006.01) | |
| B60K 6/28 | (2007.10) | |

(52) U.S. Cl.
CPC ............ *B60L 53/20* (2019.02); *B60L 53/16* (2019.02); *B60L 53/18* (2019.02); *H02J 7/0045* (2013.01); *H02P 27/06* (2013.01); *B60K 6/28* (2013.01); *B60Y 2200/91* (2013.01); *B60Y 2200/92* (2013.01); *B60Y 2300/91* (2013.01); *H02J 2207/20* (2020.01)

(58) Field of Classification Search
CPC .. B60L 53/20; B60L 53/16–18; H02J 7/0045; H02P 27/20; B60K 6/28; B60Y 2200/91–92; B60Y 2300/91
USPC ...................................................... 307/10.1
See application file for complete search history.

(56) References Cited

U.S. PATENT DOCUMENTS

2021/0078429 A1*  3/2021  Li ........................ B60L 53/11
2021/0078442 A1*  3/2021  Prasad ................. H02J 7/1423

FOREIGN PATENT DOCUMENTS

DE    102018124789 A1 *  4/2020

* cited by examiner

*Primary Examiner* — Rexford N Barnie
*Assistant Examiner* — Swarna N Chowdhuri

(57) ABSTRACT

A battery charging system includes: an electric motor including stator coils; a battery; a charge port configured to receive power from charging stations by wire; first and second electrical conductors connected between the battery and the charge port; an inverter module including (a) inputs connected to receive power from the battery and (b) outputs connected to the electric motor; a third electrical conductor; and a switch configured to electrically connect and disconnect a first end of the third electrical conductor to and from the first electrical conductor, where the third electrical conductor includes a second end that is connected to at least one of the stator coils via one of the outputs of the inverter module.

20 Claims, 7 Drawing Sheets

VEHICLE WITH INTEGRATED DC-DC CONVERTER

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle electrical systems and more particularly to direct current (DC) to DC converters of vehicles.

Some types of vehicles include only an internal combustion engine that generates propulsion torque. Electric vehicles may not include an internal combustion engine and may rely on one or more electric motors for propulsion.

Hybrid vehicles include both an internal combustion engine and one or more electric motors. Some types of hybrid vehicles utilize the electric motor and the internal combustion engine in an effort to achieve greater fuel efficiency than if only the internal combustion engine was used. Some types of hybrid vehicles utilize the electric motor and the internal combustion engine to achieve greater torque output than the internal combustion could achieve by itself.

Some example types of hybrid vehicles include parallel hybrid vehicles, series hybrid vehicles, and other types of hybrid vehicles. In a parallel hybrid vehicle, the electric motor works in parallel with the engine to combine power and range advantages of the engine with efficiency and regenerative braking advantages of electric motors. In a series hybrid vehicle, the engine drives a generator to produce electricity for the electric motor, and the electric motor drives a transmission. This allows the electric motor to assume some of the power responsibilities of the engine, which may permit the use of a smaller and possibly more efficient engine.

SUMMARY

In a feature, a battery charging system includes: an electric motor including stator coils; a battery; a charge port configured to receive power from charging stations by wire; first and second electrical conductors connected between the battery and the charge port; an inverter module including (a) inputs connected to receive power from the battery and (b) outputs connected to the electric motor; a third electrical conductor; and a switch configured to electrically connect and disconnect a first end of the third electrical conductor to and from the first electrical conductor, where the third electrical conductor includes a second end that is connected to at least one of the stator coils via one of the outputs of the inverter module.

In further features, a battery management module (BMM) is configured to selectively open and close the switch.

In further features, the BMM is configured to close the switch in response to a determination that an output voltage of a charging station connected to the charge port is less than a predetermined voltage of the battery.

In further features, the predetermined voltage of the battery is approximately 800 volts.

In further features, the BMM is configured to maintain the switch closed until a request to terminate charging is received from the charging station.

In further features, the BMM is configured to open the switch in response to the receipt of the request to terminate charging from the charging station.

In further features, the BMM is configured to maintain the switch closed until charging of the battery is complete.

In further features, the BMM is configured to open the switch in response a determination that charging of the battery is complete.

In further features, the BMM is configured to maintain the switch open in response to a determination that the output voltage of the charging station connected to the charge port is equal to the predetermined voltage of the battery.

In further features: a second switch is configured to connect and disconnect the first electrical conductor to and from the battery; and a third switch is configured to connect and disconnect the second electrical conductor to and from the battery.

In further features, a battery management module (BMM) is configured to selectively open and close the second and third switches.

In further features, the BMM is configured to close the second and third switches in response to a determination that an output voltage of a charging station connected to the charge port is equal to a predetermined voltage of the battery.

In further features, the BMM is configured to maintain the second and third switches closed until a request to terminate charging is received from the charging station.

In further features, the BMM is configured to open at least one of the second and third switches in response to the receipt of the request to terminate charging from the charging station.

In further features, the BMM is configured to maintain the second and third switches closed until charging of the battery is complete.

In further features, the BMM is configured to open at least one of the second and third switches in response a determination that charging of the battery is complete.

In further features, the BMM is configured to close the second switch and open the third switch in response to a determination that the output voltage of the charging station connected to the charge port is less than the predetermined voltage of the battery.

In further features, the electric motor is configured to drive one of: at least one front wheel of a vehicle; and at least one rear wheel of a vehicle.

In a feature, a battery charging system includes: an electric motor including stator coils; a battery; a charge port configured to receive power from charging stations by wire; first and second electrical conductors connected between the battery and the charge port; a third electrical conductor; and a switch configured to electrically connect and disconnect a first end of the third electrical conductor to and from the first electrical conductor, where the third electrical conductor includes a second end that is connected to at least one of the stator coils.

In a feature, a battery charging method includes: receiving power from a charging station by wire using a charge port; electrically connecting a battery with the charge port via first and second electrical conductors; by an inverter module, receiving power from the battery and outputting power to an electric motor, the electric motor including stator coils; by a switch, electrically connecting and disconnecting a first end of a third electrical conductor to and from the first electrical conductor, where the third electrical conductor includes a second end that is connected to at least one of the stator coils via an output of the inverter module.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An inverter module of a vehicle includes switches that regulate current flow (a) from a battery to an electric motor and (b) from the electric motor to the battery. The battery has a predetermined voltage, such as 800 volts (V) direct current (DC) or another suitable voltage. The vehicle includes a charge port through which the vehicle may receive power from charging sources.

To enable the battery to be charged via charging sources that have an output voltage that is different (e.g., less) than the predetermined voltage, the vehicle could include one or more DC to DC converters configured to convert different (charging source) output voltages to the predetermined voltage. DC-to-DC converters, however, increase vehicle cost and increase vehicle weight.

The present application involves a battery management module configured to use one or more windings of an electric motor to boost (increase) or buck (decrease) a voltage received from a charging source to the predetermined voltage of the battery to charge the battery. This eliminates the need for one or more DC-to-DC converters, reduces vehicle weight, and reduces vehicle cost.

Figure 1:
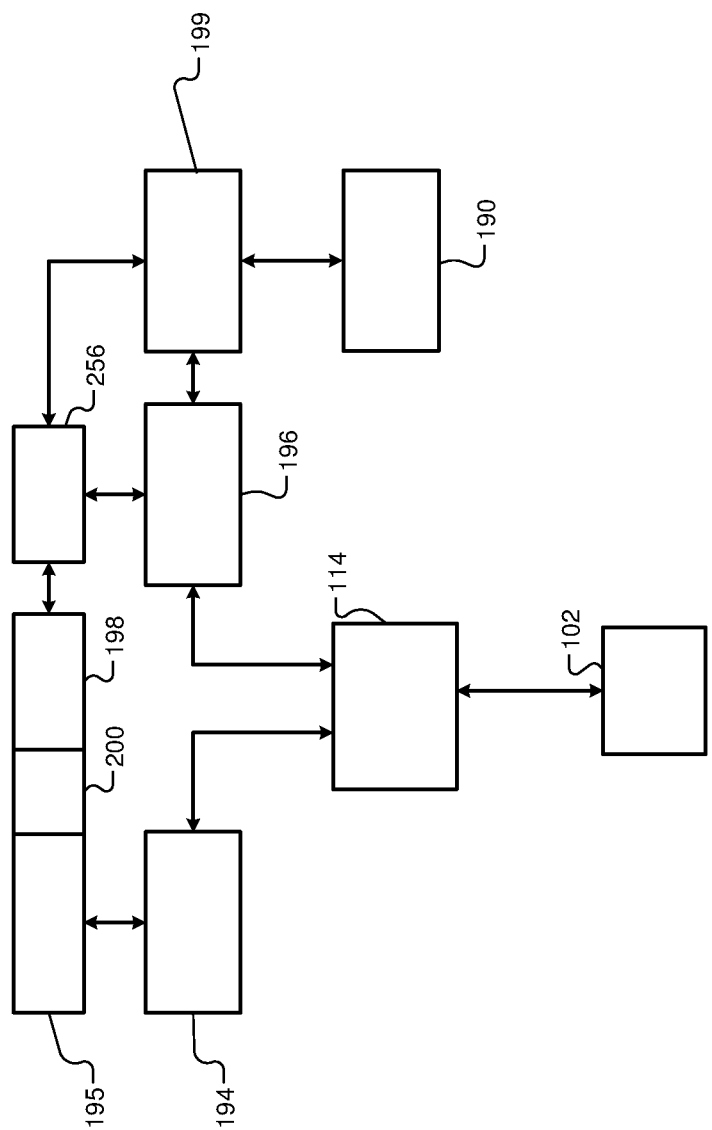
FIG. 1 is a functional block diagram of an example vehicle system.

Referring now to FIG. 1, a functional block diagram of an example vehicle system is presented. While a vehicle system for a hybrid vehicle is shown and will be described, the present disclosure is also applicable to electric vehicles that do not include an internal combustion engine (including pure electric vehicles), fuel cell vehicles, autonomous vehicles, and other types of vehicles. Also, while the example of a vehicle is provided, the present application is also applicable to non-vehicle implementations.

An engine 102 may combust an air/fuel mixture to generate drive torque. An engine control module (ECM) 114 controls the engine 102. For example, the ECM 114 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (e.g., electric vehicles), the engine 102 may be omitted.

The engine 102 may output torque to a transmission 195. A transmission control module (TCM) 194 controls operation of the transmission 195. For example, the TCM 194 may control gear selection within the transmission 195 and one or more torque transfer devices (e.g., a torque converter, one or more clutches, etc.).

The vehicle system includes one or more electric motors, such as electric motor 198. An example implementation including more than one electric motor is described below. An electric motor can act as either a generator or as a motor at a given time. When acting as a generator, an electric motor converts mechanical energy into electrical energy. The electrical energy can be, for example, used to charge a battery 199. When acting as a motor, an electric motor generates torque that may be used, for example, for vehicle propulsion. While the example of one electric motor is provided, the vehicle may include more than one electric motor.

A motor control module 196 controls power flow from the battery 199 to the electric motor 198 and from the electric motor 198 to the battery 199. The motor control module 196 applies electrical power from the battery 199 to the electric motor 198 to cause the electric motor 198 to output positive torque, such as for vehicle propulsion. The battery 199 may include, for example, one or more batteries and/or battery packs. In various implementations, the battery 199 may be referred to as a battery pack or a rechargeable energy storage system. The battery 199 may be, for example, an 800 volt (V) DC battery or have another suitable voltage rating The electric motor 198 may output torque, for example, to an input shaft of the transmission 195 or to an output shaft of the transmission 195, or to a wheel of the vehicle. A clutch 200 may be engaged to couple the electric motor 198 to the transmission 195 and disengaged to decouple the electric motor 198 from the transmission 195. One or more gearing devices may be implemented between an output of the clutch 200 and an input of the transmission 195 to provide a predetermined ratio between rotation of the electric motor 198 and rotation of the input of the transmission 195.

The motor control module 196 may also selectively convert mechanical energy of the vehicle into electrical energy. More specifically, the electric motor 198 generates and outputs power when the electric motor 198 is being driven by the transmission 195 and the motor control module 196 is not applying power to the electric motor 198 from the battery 199. The motor control module 196 may charge the battery 199 via the power output by the electric motor 198.

The vehicle includes a charge port 190. A power source, such as a charging station, another vehicle, or another suitable source of power may connect to and charge the battery 199 via the charge port 190. The battery 199 may also be used to power other devices (e.g., other vehicles) via the charge port 190.

Figure 2:
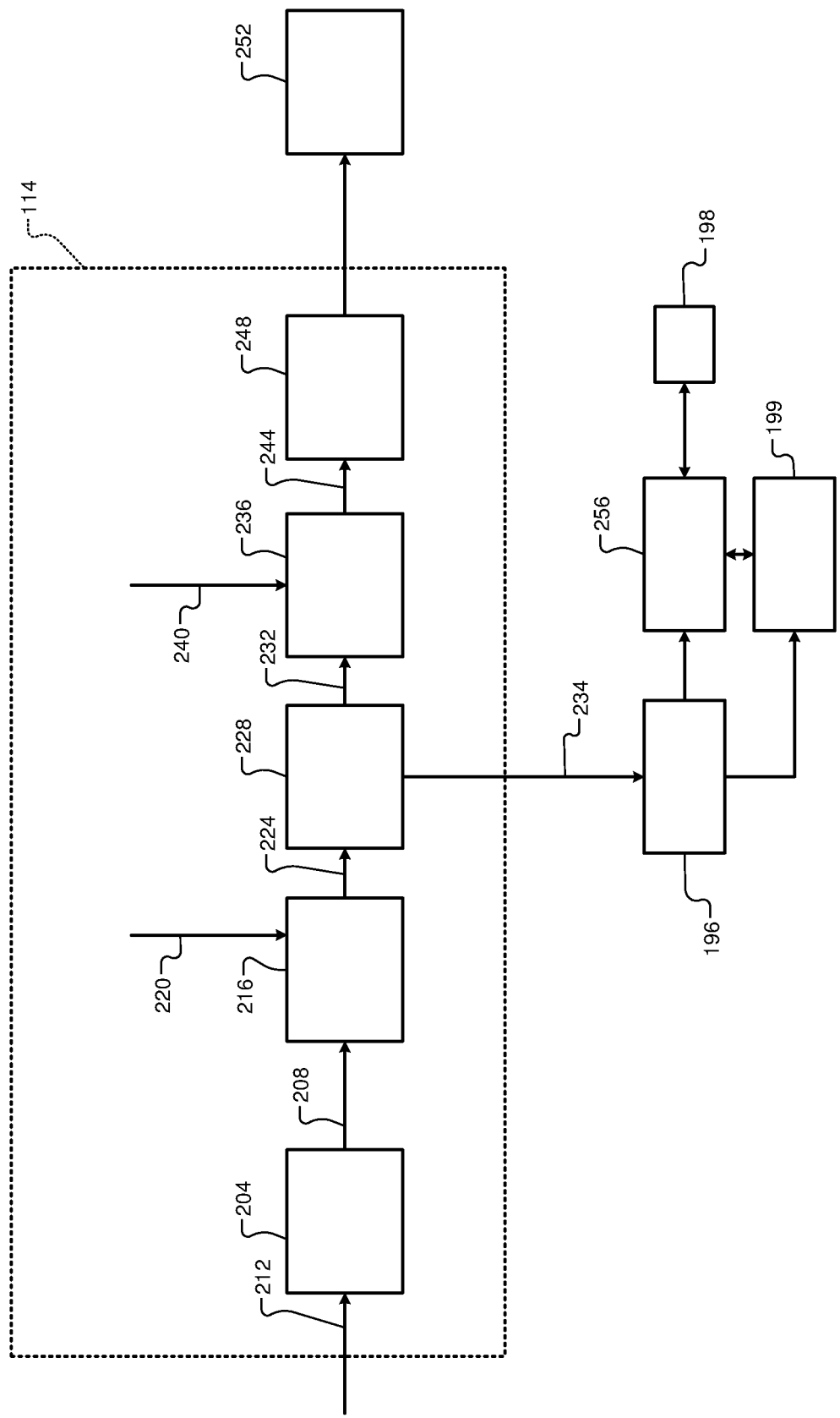
FIG. 2 is a functional block diagram of an example propulsion control system.

Referring now to FIG. 2, a functional block diagram of an example propulsion control system is presented. A driver torque module 204 determines a driver torque request 208 based on driver input 212. The driver input 212 may include, for example, an accelerator pedal position (APP), a brake pedal position (BPP), cruise control input, and/or an autonomous input. In various implementations, the cruise control input may be provided by an adaptive cruise control system that attempts to maintain at least a predetermined distance between the vehicle and objects in a path of the vehicle. The autonomous input may be provided by an autonomous driving system that controls movement of a vehicle from location to location while avoiding objects and other vehicles. The driver torque module 204 determines the driver torque request 208 based on one or more lookup tables that relate the driver inputs to driver torque requests.

The APP and BPP may be measured using one or more APP sensors and BPP sensors, respectively.

The driver torque request 208 may be an axle torque request. Axle torques (including axle torque requests) refer to torque at the wheels. As discussed further below, propulsion torques (including propulsion torque requests) are different than axle torques in that propulsion torques may refer to torque at a transmission input shaft.

An axle torque arbitration module 216 arbitrates between the driver torque request 208 and other axle torque requests 220. Axle torque (torque at the wheels) may be produced by various sources including the engine 102 and/or one or more electric motors, such as the electric motor 198. Examples of the other axle torque requests 220 include, but are not limited to, a torque reduction requested by a traction control system when positive wheel slip is detected, a torque increase request to counteract negative wheel slip, brake management requests to reduce axle torque to ensure that the axle torque does not exceed the ability of the brakes to hold the vehicle when the vehicle is stopped, and vehicle overspeed torque requests to reduce the axle torque to prevent the vehicle from exceeding a predetermined speed. The axle torque arbitration module 216 outputs one or more axle torque requests 224 based on the results of arbitrating between the received axle torque requests 208 and 220.

In hybrid vehicles, a hybrid module 228 may determine how much of the one or more axle torque requests 224 should be produced by the engine 102 and how much of the one or more axle torque requests 224 should be produced by the electric motor 198. The example of the electric motor 198 will be continued for simplicity in conjunction with the example of FIG. 2, but multiple electric motors may be included, such as discussed below with respect to the example of FIG. 3. The hybrid module 228 outputs one or more engine torque requests 232 to a propulsion torque arbitration module 236. The engine torque requests 232 indicate a requested torque output of the engine 102.

The hybrid module 228 also outputs a motor torque request 234 to the motor control module 196. The motor torque request 234 indicates a requested torque output (positive or negative) of the electric motor 198. In vehicles where the engine 102 is omitted (e.g., electric vehicles) or is not connected to output propulsion torque for the vehicle, the axle torque arbitration module 216 may output one axle torque request and the motor torque request 234 may be equal to that axle torque request. In the example of an electric vehicle, the ECM 114 may be omitted, and the driver torque module 204 and the axle torque arbitration module 216 may be implemented within the motor control module 196.

In electric vehicles, the driver torque module 204 may input the driver torque request 208 to the motor control module 196 and the components related to controlling engine actuators may be omitted. In the example of multiple electric motors, the motor control module 196 may determine how much torque should be produced by each of the electric motors. The electric motors may be controlled to achieve the same or different amounts of torque.

The propulsion torque arbitration module 236 converts the engine torque requests 232 from an axle torque domain (torque at the wheels) into a propulsion torque domain (e.g., torque at an input shaft of the transmission). The propulsion torque arbitration module 236 arbitrates the converted torque requests with other propulsion torque requests 240. Examples of the other propulsion torque requests 240 include, but are not limited to, torque reductions requested for engine over-speed protection and torque increases requested for stall prevention. The propulsion torque arbitration module 236 may output one or more propulsion torque requests 244 as a result of the arbitration.

An actuator control module 248 controls actuators 252 of the engine 102 based on the propulsion torque requests 244. For example, based on the propulsion torque requests 244, the actuator control module 248 may control opening of a throttle valve, timing of spark provided by spark plugs, timing and amount of fuel injected by fuel injectors, cylinder actuation/deactivation, intake and exhaust valve phasing, output of one or more boost devices (e.g., turbochargers, superchargers, etc.), opening of an EGR valve, and/or one or more other engine actuators. In various implementations, the propulsion torque requests 244 may be adjusted or modified before use by the actuator control module 248, such as to create a torque reserve.

The motor control module 196 controls switching of switches of an inverter module 256 based on the motor torque request 234. Switching of the inverter module 256 controls power flow from the battery 199 to the electric motor 198. As such, switching of the inverter module 256 controls torque of the electric motor 198. The inverter module 256 also converts power generated by the electric motor 198 and outputs power to the battery 199, for example, to charge the battery 199.

The inverter module 256 includes a plurality of switches. The motor control module 196 switches the switches to convert DC power from the battery 199 into alternating current (AC) power and to apply the AC power to the electric motor 198 to drive the electric motor 198. For example, the inverter module 256 may convert the DC power from the battery 199 into n-phase AC power and apply the n-phase AC power to (e.g., a, b, and c, or u, v, and w) n stator windings of the electric motor 198. In various implementations, n is equal to 3. Magnetic flux produced via current flow through the stator windings drives a rotor of the electric motor 198. The rotor is connected to and drives rotation of an output shaft of the electric motor 198.

In various implementations, one or more filters may be electrically connected between the inverter module 256 and the battery 199. The one or more filters may be implemented, for example, to filter power flow to and from the battery 199. As an example, a filter including one or more capacitors and resistors may be electrically connected in parallel with the inverter module 256 and the battery 199.

Figure 3:
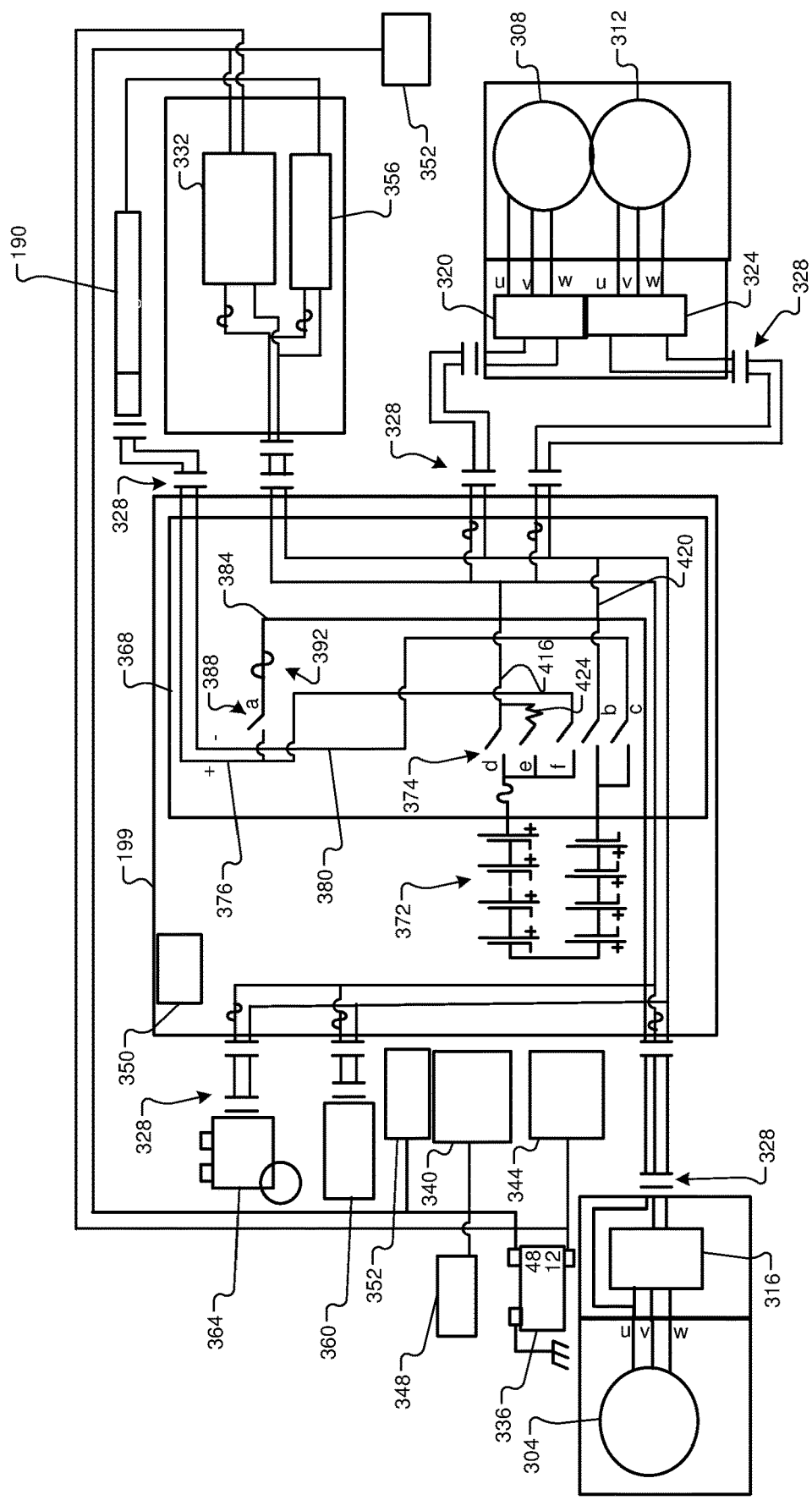
FIGS. 3-5 are functional block diagrams of example battery charging systems including a battery.

FIG. 3 includes a functional block diagram of an example battery charging system including the battery 199. As discussed above, the vehicle may include multiple electric motors, such as a front (F) electric motor 304, a rear left (RL) electric motor 308, and a rear right (RR) electric motor 312. While the example of three electric motors is provided, the present application is also applicable to one electric motor, two electric motors, and more than three electric motors.

An inverter module (IM) includes a plurality of switches and controls power flow to and from each electric motor. For example, inverter module 316 controls power flow to and from the front electric motor 304. Inverter modules 320 and 324 control power flow to and from the rear left and right electric motors 308 and 312, respectively. Electrical connectors that are configured to be electrically connectable and disconnectable are illustrated in FIG. 3, such as by 328. Other electrical connectors are not numbered.

The vehicle may include an auxiliary power module (APM) 332 configured to convert power received via the charge port 190 or the battery 372 via contactors 374 at the HV bus 376, 380 into a different voltage, such as 48 V and 12 V power. The APM 332 may supply power to, for example, an accessory battery 336. Power from the accessory battery 336 may be used on one or more vehicle accessories and/or loads, such as glass (e.g., windshield) heater 340 and various 12 V loads 344. The vehicle may include one or more low voltage battery electrical centers (BECs) 348 and/or one or more active roll control (ARC) modules 352. A battery charging module (BCM) 356 may control charging of one or more batteries of the vehicle via the power from the charge port 190.

The vehicle may also include one or more other accessories and/or loads, such as a passenger cabin resistive heater 360 and an air conditioning (AC) module 364 including a motor (M).

The battery 199 includes a battery disconnect module (BDM) 368 and a plurality of battery cells and/or battery modules 372. The battery cells and/or battery modules 372 are connected in series, parallel, or a combination of series and parallel to provide the predetermined voltage rating (e.g., 800 V).

The BDM 368 includes a plurality of switches 374 configured to connect and disconnect power from the charge port 190 to the battery cells and/or battery modules 372 and to connect and disconnect the battery modules 372 to and from a positive high voltage (HV) DC bus 416 and a negative HV DC bus 420. A precharge resistor 424 may be connected through a switch (e), such as to build the HV DC bus voltage while limiting inrush current before closing switch (d).

In one example, first (e.g., +) and second (e.g., −) electrical conductors 376 and 380 may be connected to a connector 328 and receive power via the charge port 190. One of the switches 374 (e.g., f) may be configured to connect and disconnect the battery cells and/or battery modules 372 to and from the first electrical conductor 376. Another one of the switches 374 (e.g., c) may be configured to connect and disconnect the battery cells and/or battery modules 372 to and from the second electrical conductor 380. Electrical conductors also connect the inverter modules 316, 320, and 324 to the first and second electrical conductors 416 and 420 of the HV DC bus. As such, when one or more of the first ones of the switches 374 (e.g., d) is closed and one or more of the second ones of the switches 374 (e.g., b) is closed, power can flow from the battery cells and/or battery modules 372 to one or more of the motors 304-312 via switching of the respective inverter modules 316-324.

A battery management module (BMM) 350 one or more conditions of the battery. The BMM 350 may communicate with motor/inverter control modules that control the inverter modules. The BMM 350 also controls charging of the battery cells and/or battery modules 372.

If the charge port 190 is connected to a charging source having a lower output voltage than the predetermined voltage of the battery cells and/or battery modules 372, however, that charging source may be unable to charge the battery cells and/or battery modules 372.

Figure 4:
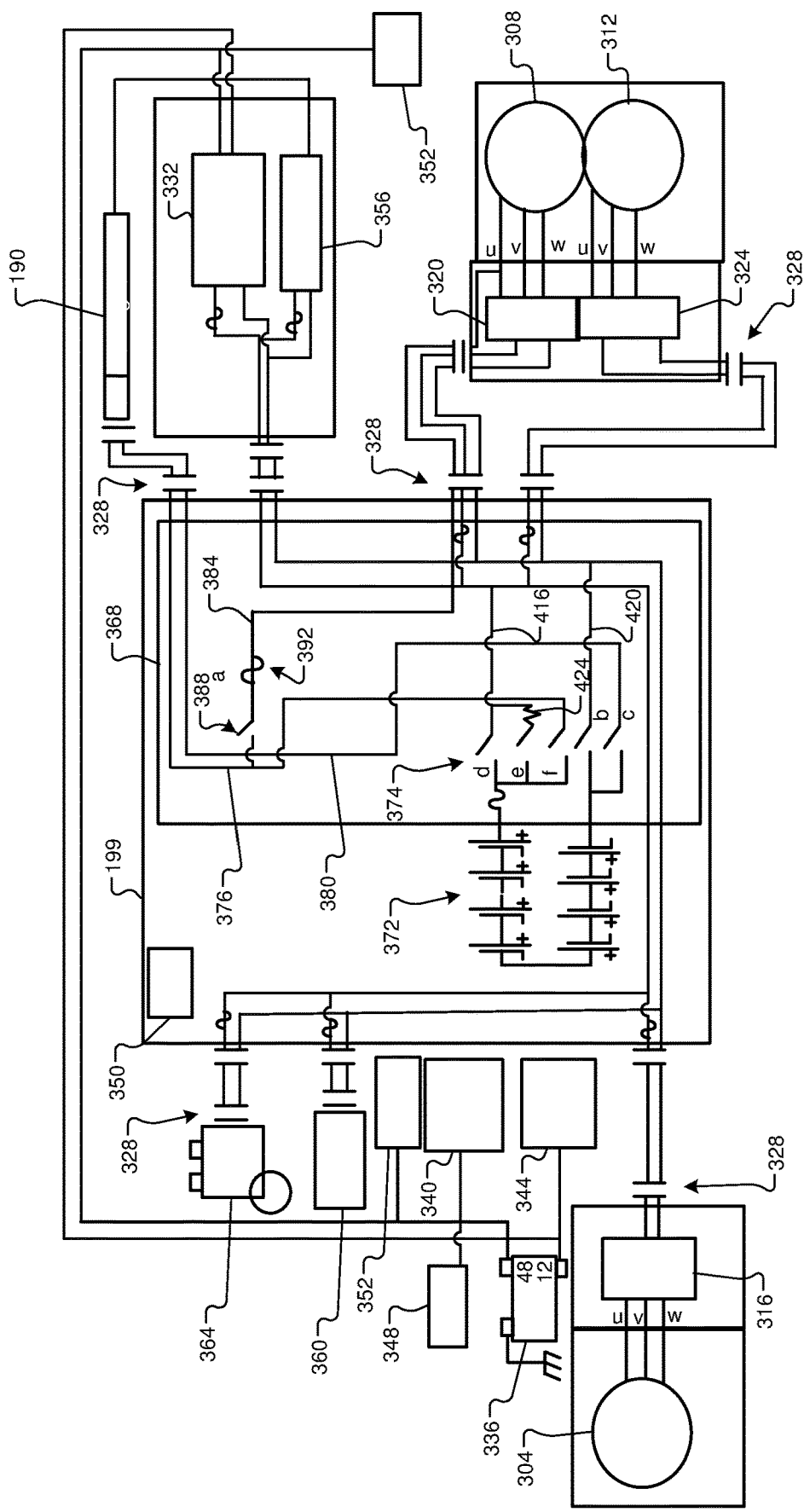
Figure 5:
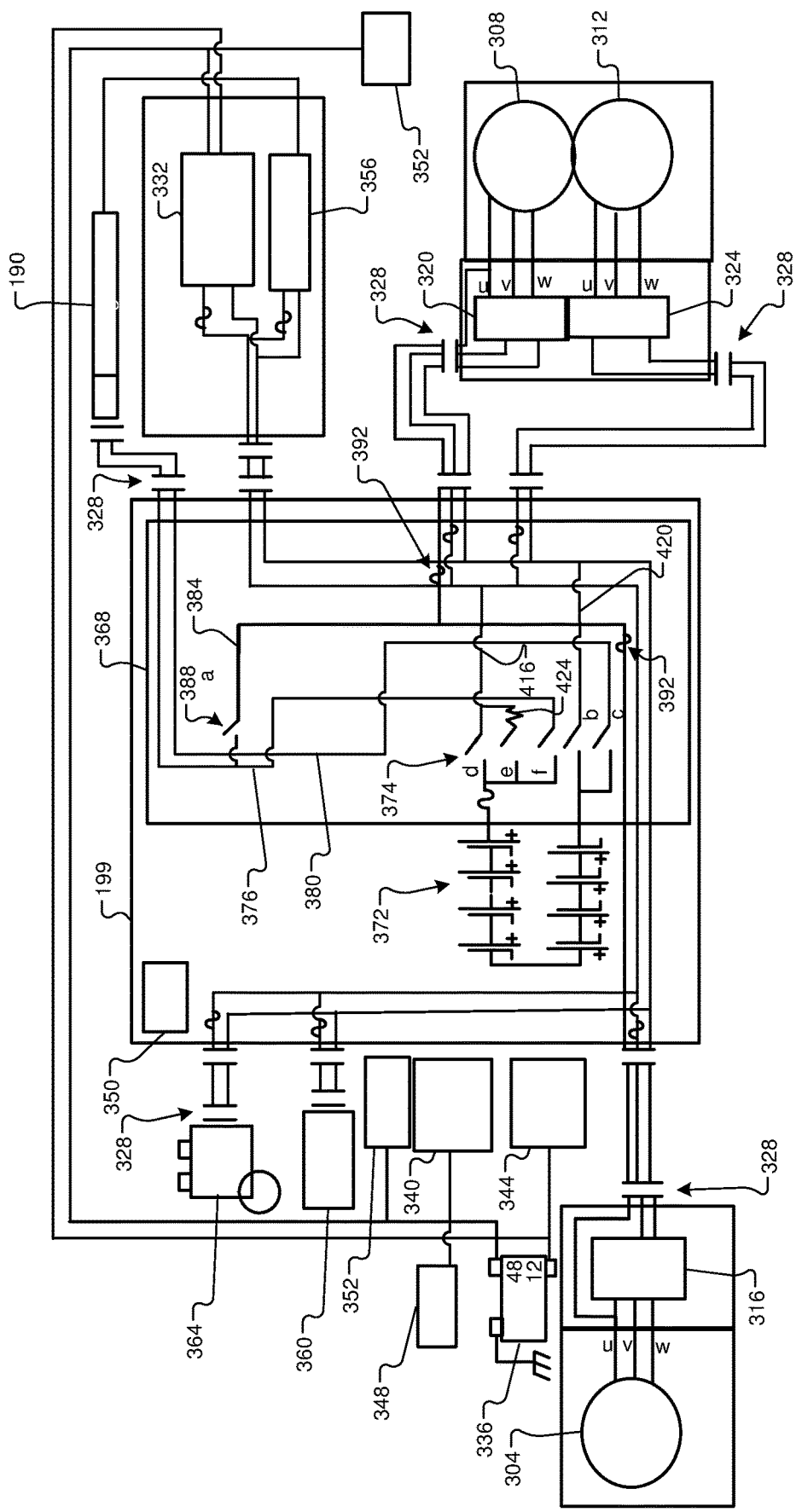

According to the present application, a third electrical conductor 384 is connected at one end to the first electrical conductor 376. A second end of the third electrical conductor 384 is connected to one of the motors (motor 304 in the example of FIG. 3) via one or more of the connectors 328. While the example of the motor 304 is provided, the third electrical conductor 384 may alternatively be connected to a rear motor, such as the motor 308, such as in the example of FIG. 4. Also, while the example of the third electrical conductor 384 being connected to one motor is provided in FIGS. 3 and 4, the third electrical conductor 384 may be connected to two motors, such as shown in the example of FIG. 5.

The motor(s) to which the third electrical conductor 384 is connected may utilize one or more three input/output (pin) connector(s). This is in contrast to one or more other motors, which is/are connected to the first and second electrical conductors 376 and 380 via two input/output (pin) connectors.

The stator coils of the motors are inductive (e.g., inductors). As shown, the third electrical conductor 384 flows around the associated inverter module (e.g., 316 in the example of FIG. 3) to an output terminal of the associated inverter module and directly to a terminal of the associated motor (e.g., u of the motor 304 in the example of FIG. 3). The stator coil(s) of the motor are used as a voltage converter (e.g., a boost converter or a buck converter) to convert the voltage received via the charge port to the predetermined voltage of the battery cells and/or battery modules 372. This enables charging of the battery cells and/or battery modules 372 with chargers having different output voltages than the predetermined voltage of the battery cells and/or battery modules 372. Also, a separate DC/DC converter is not needed. Thus, the battery 199 (and the vehicle) are less costly than including one or more DC/DC converters to convert from different input voltages to the predetermined voltage of the battery cells and/or battery modules 372.

The motor(s) that is/are used to convert the input voltage to the predetermined voltage of the battery cells and/or battery modules 372 may be three terminal motors or four terminal motors (with a neutral terminal). A switch 388 may be included and configured to connect and disconnect the third electrical conductor 384 to and from the first electrical conductor 376. A fuse 392 may be connected in series with the switch 388. Other fuses are also shown in FIG. 4.

The switch 388 may be a relay or another suitable type of switch. The switches 374 may be, for example, contactors or another suitable type of switch, such as solid state switches including power semiconductor devices.

Figure 6:
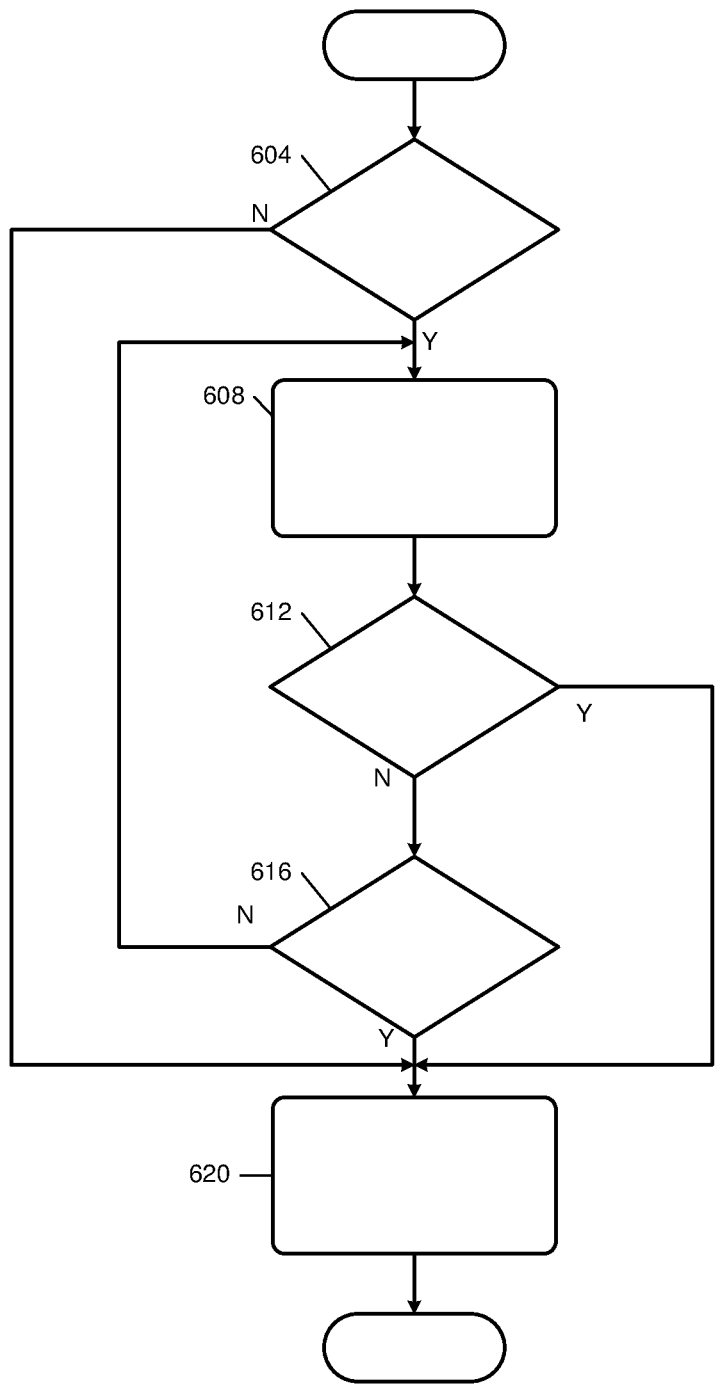
FIGS. 6-7 include flowcharts depicting example methods of controlling charging of a battery.

FIG. 6 is a flowchart depicting an example method of controlling charging of the battery 199, which has the predetermined voltage (e.g., 800 V DC). While the example of 800 V DC is provided, the present application is also applicable to batteries of other voltages.

Control begins with 604 where the BMM 350 determines whether the predetermined voltage of the battery 199 (e.g., 800 V DC) is being received via the charge port 190. If 604 is true, control continues with 608. If 604 is false, the BMM 350 may open all of the switches 374 and 388 at 620, and control may end.

At 608, the BMM 350 closes ones of the switches 374 (Sc and Sf) to connect the first and second electrical conductors 376 and 380 to the battery cells and/or battery modules 372 to charge the battery cells and/or battery modules 372. The BMM 350 may open all of the other switches 374 and 388.

At 612, the BMM 350 determines whether to transmit a request to terminate charging the charge port 190. If 612 is true, the BMM 350 may open all of the switches 374 and 388 at 620, and control may end. If 612 is false, control may continue with 616.

At 616, the BMM 350 may determine whether charging of the battery 199 is complete. For example, the BMM 350 may determine whether the present voltage of the battery 199 is greater than or equal to a predetermined voltage, whether a state of charge of the battery 199 is greater than a predetermined state of charge, or determine whether charging is complete in another suitable manner. If 616 is false, control may return to 608. If 616 is true, the BMM 350 may open all of the switches 374 and 388 at 620, and control may end.

Figure 7:
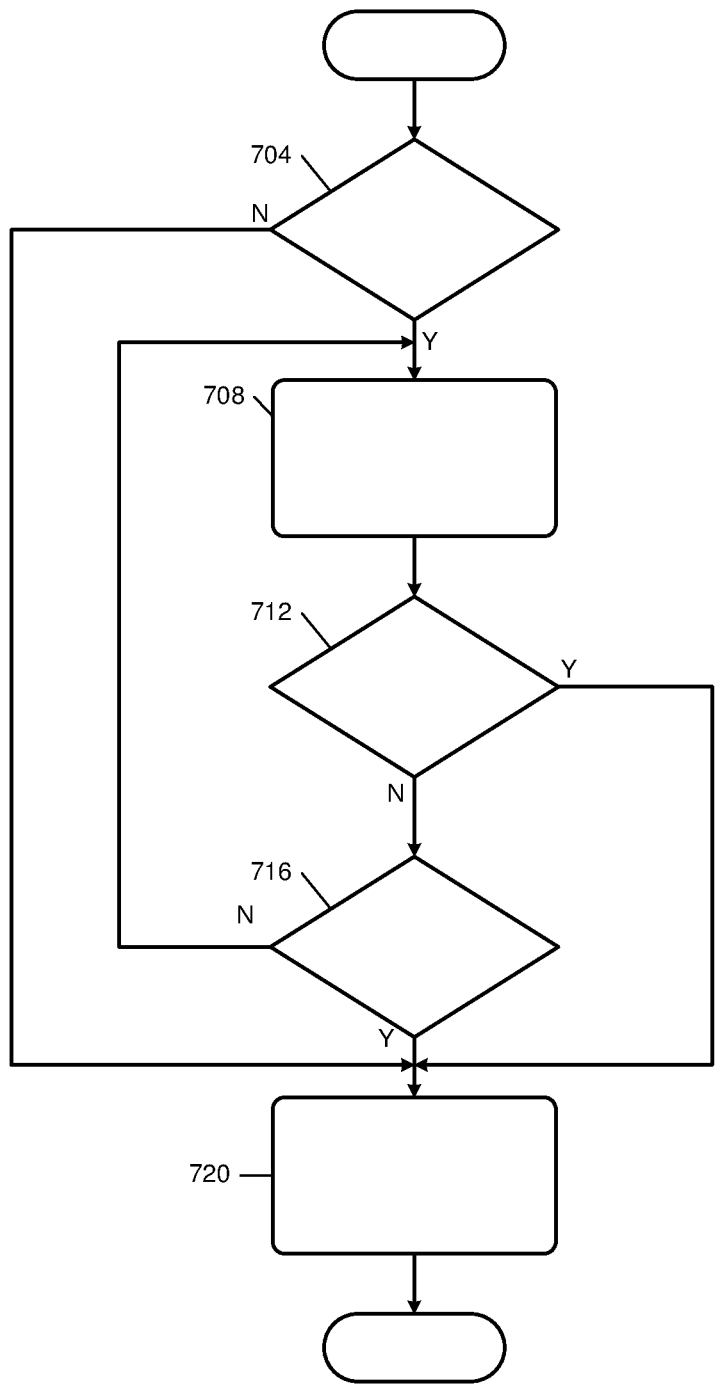

FIG. 7 is a flowchart depicting an example method of controlling charging of the battery 199, which has the predetermined voltage (e.g., 800 V DC). While the example of 800 V DC is provided, the present application is also applicable to batteries of other voltages.

Control begins with 704 where the BMM 350 determines whether a voltage that is lower/less than (e.g., 400 V DC) than the predetermined voltage of the battery 199 (e.g., 800 V DC) is being received via the charge port 190. If 704 is true, control continues with 708. If 704 is false, the BMM 350 may open all of the switches 374 and 388 at 720, and control may end. Alternatively, if 704 is false, control may transfer to 604.

At 708, the BMM 350 opens ones of the switches 374 (Sc, Sf) and closes other ones of the switches 374 (Sd, Sb, Sc) and the switch 388 (Sa) to connect the first and second electrical conductors 376 and 380 to the battery cells and/or battery modules 372 to charge the battery cells and/or battery modules 372 and to connect the third conductor 384 to the motor (e.g., the motor 304) to use the motor as a voltage converter (e.g., a boost converter).

At 712, the BMM 350 determines whether a request to terminate charging has been received from the charging source (connected to the charge port 190). If 712 is true, the BMM 350 may open all of the switches 374 and 388 at 720, and control may end. If 712 is false, control may continue with 716.

At 716, the BMM 350 may determine whether charging of the battery 199 is complete. For example, the BMM 350 may determine whether the present voltage of the battery 199 is greater than or equal to a predetermined voltage, whether a state of charge of the battery 199 is greater than a predetermined state of charge, or determine whether charging is complete in another suitable manner. If 716 is false, control may return to 708. If 716 is true, the BMM 350 may open all of the switches 374 and 388 at 720, and control may end.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A battery charging system, comprising:
an electric motor including stator coils;
a battery;
a charge port configured to receive power from charging stations by wire;
first and second electrical conductors connected between the battery and the charge port;
an inverter module including (a) inputs connected to receive power from the battery and (b) outputs connected to U, V, and W phases of the electric motor and configured to output positive reference potentials to the electric motor;
a third electrical conductor; and
a switch configured to electrically connect and disconnect a first end of the third electrical conductor to and from the first electrical conductor,
wherein the third electrical conductor includes a second end that is directly connected to the U phase of the electric motor and one of the outputs of the inverter module.

2. The battery charging system of claim 1 further comprising a battery management module (BMM) configured to selectively open and close the switch.

3. The battery charging system of claim 2 wherein the BMM is configured to close the switch in response to a determination that an output voltage of a charging station connected to the charge port is less than a predetermined voltage of the battery.

4. The battery charging system of claim 3 wherein the predetermined voltage of the battery is approximately 800 volts.

5. The battery charging system of claim 3 wherein the BMM is configured to maintain the switch closed until a request to terminate charging is received from the charging station.

6. The battery charging system of claim 5 wherein the BMM is configured to open the switch in response to the receipt of the request to terminate charging from the charging station.

7. The battery charging system of claim 3 wherein the BMM is configured to maintain the switch closed until charging of the battery is complete.

8. The battery charging system of claim 7 wherein the BMM is configured to open the switch in response a determination that charging of the battery is complete.

9. The battery charging system of claim 3 wherein the BMM is configured to maintain the switch open in response to a determination that the output voltage of the charging station connected to the charge port is equal to the predetermined voltage of the battery.

10. The battery charging system of claim 1 further comprising:
a second switch configured to connect and disconnect the first electrical conductor to and from the battery; and
a third switch configured to connect and disconnect the second electrical conductor to and from the battery.

11. The battery charging system of claim 10 further comprising a battery management module (BMM) configured to selectively open and close the second and third switches.

12. The battery charging system of claim 11 wherein the BMM is configured to close the second and third switches in response to a determination that an output voltage of a charging station connected to the charge port is equal to a predetermined voltage of the battery.

13. The battery charging system of claim 12 wherein the BMM is configured to maintain the second and third switches closed until a request to terminate charging is received from the charging station.

14. The battery charging system of claim 13 wherein the BMM is configured to open at least one of the second and third switches in response to the receipt of the request to terminate charging from the charging station.

15. The battery charging system of claim 12 wherein the BMM is configured to maintain the second and third switches closed until charging of the battery is complete.

16. The battery charging system of claim 15 wherein the BMM is configured to open at least one of the second and third switches in response a determination that charging of the battery is complete.

17. The battery charging system of claim 12 wherein the BMM is configured to close the second switch and open the third switch in response to a determination that the output voltage of the charging station connected to the charge port is less than the predetermined voltage of the battery.

18. The battery charging system of claim 1 wherein the electric motor is configured to drive one of:

at least one front wheel of a vehicle; and
at least one rear wheel of a vehicle.

19. A battery charging system, comprising:
an electric motor including stator coils;
a battery;
a charge port configured to receive power from charging stations by wire;
first and second electrical conductors connected between the battery and the charge port;
a third electrical conductor; and
a switch configured to electrically connect and disconnect a first end of the third electrical conductor to and from the first electrical conductor,
wherein the third electrical conductor includes a second end that is directly connected to (a) the U phase of the electric motor and (b) one output of a group of outputs of an inverter module, the outputs of the inverter module connected to U, V, and W phases of the electric motor and configured to output positive reference potentials to the electric motor.

20. A battery charging method, comprising:
receiving power from a charging station by wire using a charge port;
electrically connecting a battery with the charge port via first and second electrical conductors;
by an inverter module, receiving power from the battery and outputting power to via outputs of the inverter module to U, V, and W phases of an electric motor, the electric motor including stator coils, and the outputs configured to output positive reference potentials to the electric motor; and
by a switch, electrically connecting and disconnecting a first end of a third electrical conductor to and from the first electrical conductor,
wherein the third electrical conductor includes a second end that is directly connected to the U phase of the electric motor and one of the outputs of the inverter module.

* * * * *